United States Patent
Sun et al.

(10) Patent No.: US 11,132,325 B2
(45) Date of Patent: Sep. 28, 2021

(54) METHOD AND DEVICE FOR CUSTOMIZING A USB RECORDING FUNCTION, AND A COMPUTER READABLE STORAGE MEDIUM

(71) Applicant: SHENZHEN SKYWORTH-RGB ELECTRONIC CO., LTD., Guangdong (CN)

(72) Inventors: Bangyu Sun, Guangdong (CN); Huibo Wang, Guangdong (CN); Xiao Wang, Guangdong (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 116 days.

(21) Appl. No.: 16/580,664

(22) Filed: Sep. 24, 2019

(65) Prior Publication Data

US 2020/0019528 A1   Jan. 16, 2020

Related U.S. Application Data

(63) Continuation of application No. PCT/CN2018/075901, filed on Feb. 9, 2018.

(30) Foreign Application Priority Data

Nov. 10, 2017   (CN) .......................... 201711120640.6

(51) Int. Cl.
*G06F 13/42*   (2006.01)
*G06K 7/14*   (2006.01)
(Continued)

(52) U.S. Cl.
CPC ....... *G06F 13/4282* (2013.01); *G06K 7/1413* (2013.01); *G06Q 20/04* (2013.01); *G06F 2213/0042* (2013.01)

(58) Field of Classification Search
USPC ................ 386/200–234, 239–262, 291–299, 386/326–342
See application file for complete search history.

(56) References Cited

U.S. PATENT DOCUMENTS 7,933,950 B1   4/2011   Barton et al.
2002/0144116 A1   10/2002   Giobbi
(Continued)

FOREIGN PATENT DOCUMENTS

CN   1738429 A   2/2006
CN   1894966 A   1/2007
(Continued)

OTHER PUBLICATIONS

International Search Report dated Aug. 2, 2018; PCT/CN2018/075901.
(Continued)

*Primary Examiner* — Hung Q Dang
(74) *Attorney, Agent, or Firm* — Westbridge IP LLC

(57) ABSTRACT

Disclosed is a method for customizing a USB recording function, which includes: judging whether the USB recording function corresponding to a program cache instruction is in an open state, on condition that the program cache instruction is acquired; if the USB recording function is in an un-open state, acquiring a first request key and obtaining a first activation key based on the first request key; and acquiring information at a WEB end according to the first request key, matching the first activation key with a second activation key acquired from the WEB end, and activating the USB recording function on condition that the first activation key is consistent with the second activation key. The present disclosure further provides a device for customizing the USB recording function and a computer readable storage medium.

12 Claims, 4 Drawing Sheets

(51) Int. Cl.
*G06Q 20/04* (2012.01)
*H04N 21/835* (2011.01)
*H04N 21/6334* (2011.01)
*H04N 21/433* (2011.01)
*H04N 21/4147* (2011.01)
*H04N 21/475* (2011.01)
*G06F 13/38* (2006.01)
*G06F 21/60* (2013.01)

(56) References Cited

U.S. PATENT DOCUMENTS

| | | | |
|---|---|---|---|
| 2004/0093619 A1 | 5/2004 | Cox | |
| 2005/0228877 A1* | 10/2005 | Monitzer | G06F 21/10 709/223 |
| 2009/0185788 A1* | 7/2009 | Lee | H04N 21/4325 386/297 |
| 2009/0300735 A1* | 12/2009 | Wiesinger | G11B 20/00086 726/5 |
| 2012/0120250 A1 | 5/2012 | Shintani et al. | |
| 2015/0020189 A1* | 1/2015 | Soffer | G06F 21/85 726/16 |

FOREIGN PATENT DOCUMENTS

| | | |
|---|---|---|
| CN | 101291477 A | 10/2008 |
| CN | 101593154 A | 12/2009 |
| CN | 102025953 A | 4/2011 |
| CN | 103400062 A | 11/2013 |
| CN | 104123124 A | 10/2014 |
| CN | 106533668 A | 3/2017 |

OTHER PUBLICATIONS

The First Chinese Office Action dated Jan. 25, 2019; Appln. No. 201711120640.6.
English only of the Second Chinese Office Action dated Aug. 5, 2019; Appln. No. 201711120640.6.
Extended European Search Report in counterpart European Application No. 18876139.9, dated Aug. 3, 2020.

* cited by examiner

METHOD AND DEVICE FOR CUSTOMIZING A USB RECORDING FUNCTION, AND A COMPUTER READABLE STORAGE MEDIUM

CROSS-REFERENCE TO RELATED APPLICATIONS

The present disclosure is a Continuation Application of PCT Application with No. PCT/CN2018/075901, filed on Feb. 9, 2018, which claims the priority of Chinese Patent Application with No. 201711120640.6, entitled "METHOD AND DEVICE FOR CUSTOMIZING A USB RECORDING FUNCTION, AND A COMPUTER READABLE STORAGE MEDIUM", filed on Nov. 10, 2017, which is hereby incorporated by reference in its entirety.

TECHNICAL FIELD

The present disclosure relates to the technical field of digital television, and in particular, to a method and a device for customizing a USB recording function, and a computer readable storage medium.

BACKGROUND

The widely applied USB recording technology is mainly employed in time shift playing regarding digital TVs. As the capacity and speed of hard disk have been continuously evolving, the Personal Video Recording (PVR) based on the hard disk becomes used a modern consumption habit, and contributes the born of the USB recording technology. The USB recording technology features the hard disk as the storage medium, establishes a vast volume of local buffer cache as well as program storage library, to control and manage the programs by the digital processing technology. As such, the USB recording technology has the features of large-capacity hard disk, digital, and fast access.

However, a large number of users may not actually use the USB recording function, due to the viewing habits demands. A patent fee should be payed for the TVs adopting the PVR technology. Namely, the problem lies in that many users who never use the PVR technology still have to pay the patent fee to the digital TV manufacturers, increasing an unneeded economic burden to some consumers.

The contents above are only intended to assist in understanding the technical solution of the present disclosure, but not to represent the related art.

SUMMARY

It is therefore one main objective of the disclosure to provide a method and a device for customizing a USB recording function, and a computer readable storage medium, aiming at solving the charging problem of customizing the USB recording function.

In order to achieve the above objective, the present disclosure provides a method for customizing a USB recording function, applied to a system for customizing the USB recording function, the system includes a TV end and a WEB end, and the method includes the following operations:

judging whether the USB recording function corresponding to a program cache instruction is in an open state, on condition that the program cache instruction is acquired;

if the USB recording function is in an un-open state, acquiring a first request key and obtaining a first activation key based on the first request key; and acquiring information at a WEB end according to the first request key, matching the first activation key with a second activation key acquired from the WEB end, and activating the USB recording function on condition that the first activation key is consistent with the second activation key.

The operation of if the USB recording function is in an un-open state, acquiring a first request key and obtaining a first activation key based on the first request key, includes:

acquiring the first request key, and displaying the first request key on the TV end; and acquiring the first activation key corresponding to the first request key through a preset algorithm.

The operation of matching the first activation key with a second activation key acquired from the WEB end, and activating the USB recording function on condition that the first activation key is consistent with the second activation key, includes:

comparing the second activation key with the first activation key to judge whether the second activation key is consistent with the first activation key, on condition that the second activation key of the WEB end is acquired; and if yes, activating the USB recording function.

After the operation of comparing the second activation key with the first activation key to judge whether the second activation key is consistent with the first activation key, on condition that the second activation key of the WEB end is acquired, the method further includes:

if not, popping up a message to indicate a failure of activation.

The system for customizing the USB recording function includes a code scanner, and before the operation of judging whether the USB recording function corresponding to a program cache instruction is in an open state, on condition that the program cache instruction is acquired, the method further includes:

storing bar code information scanned by the code scanner on condition that an instruction for storing bar code information is received; and converting the bar code information into the first request key.

After the operation of acquiring information at a WEB end according to the first request key, matching the first activation key with a second activation key acquired from the WEB end, and activating the USB recording function on condition that the first activation key is consistent with the second activation key, the method further includes:

paying, by a TV producer, a patent fee according to a quantity of the first activation key, on condition that the USB recording function is successfully activated.

The system includes a WEB end and a TV end, and the method for customizing a USB recording function includes the following operations:

generating and acquiring an acquisition instruction for a second activation key based on a first request key, on condition that the WEB end receives the first request key;

acquiring a second activation key based on the acquisition instruction for the second activation key; and outputting the second activation key through the WEB end, to allow the TV end to activate the USB recording function.

The WEB end includes a client end and a server end, and the operation of acquiring a second activation key based on the acquisition instruction for the second activation key includes:

sending the acquisition instruction for the second activation key to the server end, on condition that the client end acquires the acquisition instruction for the second activation key; and outputting the second activation key, on condition that the second activation key fed back by the server end is acquired based on the second activation key acquiring instruction.

In addition, in order to achieve the above objective, the present disclosure further provides a device for customizing a USB recording function, and the device includes a memory, a processor, and a program for customizing the USB recording function stored on the memory and executable on the processor, and the program, when executed by the processor, performs the following operations:

judging whether the USB recording function corresponding to a program cache instruction is in an open state, on condition that the program cache instruction is acquired;

if the USB recording function is in an un-open state, acquiring a first request key and obtaining a first activation key based on the first request key; and acquiring information at a WEB end according to the first request key, matching the first activation key with a second activation key acquired from the WEB end, and activating the USB recording function on condition that the first activation key is consistent with the second activation key.

The program, when executed by the processor, further performs the following operations:

acquiring the first request key, and displaying the first request key on the TV end; and acquiring the first activation key corresponding to the first request key through a preset algorithm.

The program, when executed by the processor, further performs the following operations:

comparing the second activation key with the first activation key to judge whether the second activation key is consistent with the first activation key, on condition that the second activation key of the WEB end is acquired; and if yes, activating the USB recording function.

The program, when executed by the processor, further performs the following operations:

generating and acquiring an acquisition instruction for a second activation key based on the first request key, on condition that the WEB end receives the first request key;

acquiring the second activation key based on the acquisition instruction for the second activation key; and outputting the second activation key through the WEB end, to allow the TV end to activate the USB recording function.

In addition, in order to achieve the above objective, the present disclosure further provides a computer readable storage medium, and a program for customizing a USB recording function is stored on the computer readable storage medium, and the program, when executed by a processor, performs the following operations:

judging whether the USB recording function corresponding to a program cache instruction is in an open state, on condition that the program cache instruction is acquired;

if the USB recording function is in an un-open state, acquiring a first request key and obtaining a first activation key based on the first request key; and acquiring information at a WEB end according to the first request key, matching the first activation key with a second activation key acquired from the WEB end, and activating the USB recording function on condition that the first activation key is consistent with the second activation key.

The program, when executed by the processor, further performs the following operations:

acquiring the first request key, and displaying the first request key on the TV end; and acquiring the first activation key corresponding to the first request key through a preset algorithm.

The program, when executed by the processor, further performs the following operations:

comparing the second activation key with the first activation key to judge whether the second activation key is consistent with the first activation key, on condition that the second activation key of the WEB end is acquired; and if yes, activating the USB recording function.

In the present disclosure, judging whether the USB recording function corresponding to a program cache instruction is in an open state, on condition that the program cache instruction is acquired; if the USB recording function is in an un-open state, acquiring a first request key and obtaining a first activation key based on the first request key; and acquiring information at the WEB end according to the first request key, matching the first activation key with a second activation key acquired from the WEB end, and activating the USB recording function on condition that the first activation key is consistent with the second activation key. User can acquire the activation key from a designated website to activate the USB recording function when user needs to use the USB recording function. The present disclosure provides an idea of customizing functions. In detail, user can customize some functions by performing several simple activating operations, then the manufacturer would pay the extra cost. As such, the cost is reduced while the integrity of functions of TV is maintained.

The realization of the aim, functional characteristics, advantages of the present disclosure are further described specifically with reference to the accompanying drawings and embodiments.

DETAILED DESCRIPTION OF THE EMBODIMENTS

It is to be understood that, the exemplary embodiments of the present disclosure are used for illustrating the present disclosure rather than restricting the present disclosure.

Figure 1:
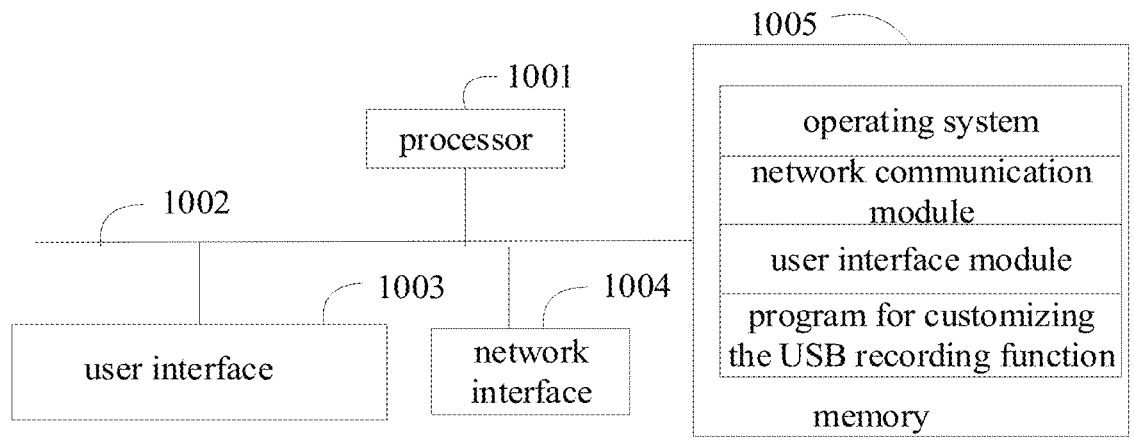
FIG. 1 is a schematic structural diagram of a terminal in a hardware operating environment according to an embodiment of the present disclosure, in which a device for customizing a USB recording function belongs to the terminal.

As shown in FIG. 1, FIG. 1 shows a schematic structural diagram of a terminal in a hardware operating environment according to an embodiment of the present disclosure.

In the embodiment of the present disclosure, the terminal may be a PC, or a mobile terminal device with display function such as a smart phone, a tablet computer, an e-book reader, a Moving Picture Experts Group Audio Layer III (MP3) player, a Moving Picture Experts Group Audio Layer IV (MP4) player, a portable computer, etc.

As shown in FIG. 1, the terminal may include a processor 1001, such as a CPU, a network interface 1004, a user interface 1003, a memory 1005, and a communication bus 1002. The communication bus 1002 is configured to realize connections and communications among these components. The user interface 1003 may include a display, an input unit such as a keyboard. Optionally, the user interface 1003 may also include a standard wired interface, a wireless interface. The network interface 1004 may optionally include a standard wired interface, a wireless interface (such as a WI-FI interface). The memory 1005 may be a high-speed RAM memory or a non-volatile memory such as a disk memory. The memory 1005 may alternatively be a storage device independent of the aforementioned processor 1001.

Optionally, the terminal may further include a camera, a Radio Frequency (RF) circuitry, a sensor, an audio circuitry, a WiFi module, etc. The sensor can include light sensor, motion sensor, and the like. Specifically, the light sensor may include an ambient light sensor and a proximity sensor. The ambient light sensor may adjust the brightness of the display screen according to the brightness of ambient light, and the proximity sensor may turn off the display screen and/or backlight when the mobile terminal moves to the ear. The gravity acceleration sensor, which is regarded as a kind of motion sensor, can detect the magnitudes of accelerations in all directions (generally including X axis, Y axis, and Z axis). The gravity acceleration sensor can also detect the magnitude and direction of gravity when the terminal is still. As such the gravity acceleration sensor can be applied to application for identifying attitude of mobile terminal (such as an application for switching the screen between horizontal orientation and vertical orientation, an application related to game, an application for calibrating attitude of magnetometer), can also be applied to application for identifying vibration (such as pedometer, tapping), etc. Of course, the mobile terminal can also be equipped with a gyroscope, a barometer, a hygrometer, a thermometer, an infrared sensor, and the like, which is not described repeatedly herein.

Those skilled in the art can understand that the structure as shown in FIG. 1 does not constitute a limitation on the terminal, and the terminal may include more or fewer components than shown, or a combination of some components, or different components.

As shown in FIG. 1, the memory 1005 which is regarded as a computer storage medium may include an operating system, a network communication module, a user interface module, and a program for customizing the USB recording function.

In the terminal as shown in FIG. 1, the network interface 1004 is mainly configured to connect with a background server and perform data communication with the background server. The user interface 1003 is mainly configured to connect with a client end (such as a user end) and perform data communication with the client end. The processor 1001 may be configured to call the program for customizing the USB recording function stored on the memory 1005.

In this embodiment, the device for customizing the USB recording function includes a memory 1005, a processor 1001, and a program for customizing the USB recording function stored on the memory 1005 and executable on the processor 1001. The processor 1001 can call the program for customizing the USB recording function stored on the memory 1005 to perform the following operations:

judging whether the USB recording function corresponding to a program cache instruction is in an open state, on condition that the program cache instruction is acquired;

if the USB recording function is in an un-open state, acquiring a first request key and obtaining a first activation key based on the first request key; and acquiring information at a WEB end according to the first request key, matching the first activation key with a second activation key acquired from the WEB end, and activating the USB recording function on condition that the first activation key is consistent with the second activation key.

The processor 1001 can call the program for customizing the USB recording function stored on the memory 1005 to further perform the following operations:

on condition that the USB recording function is in an un-open state, acquiring the first request key, and displaying the first request key on the TV end; and acquiring the first activation key corresponding to the first request key through a preset algorithm.

The processor 1001 can call the program for customizing the USB recording function stored on the memory 1005 to further perform the following operations:

comparing the second activation key with the first activation key to judge whether the second activation key is consistent with the first activation key, on condition that the second activation key of the WEB end is acquired; and if yes, activating the USB recording function.

The processor 1001 can call the program for customizing the USB recording function stored on the memory 1005 to further perform the following operations:

if the second activation key is inconsistent with the first activation key, popping up a message to indicate a failure of activation.

The processor 1001 can call the program for customizing the USB recording function stored on the memory 1005 to further perform the following operations:

storing bar code information scanned by the code scanner on condition that an instruction for storing bar code information is received; and converting the bar code information into the first request key.

The processor 1001 can call the program for customizing the USB recording function stored on the memory 1005 to further perform the following operations:

paying, by a TV producer, a patent fee according to a quantity of the first activation key, on condition that the USB recording function is successfully activated.

The processor 1001 calls the program for customizing the USB recording function stored on the memory 1005, to further perform the following operations:

generating and acquiring an acquisition instruction for a second activation key based on a first request key, on condition that the WEB end receives the first request key;

acquiring a second activation key based on the acquisition instruction for the second activation key; and outputting the second activation key through the WEB end, to allow the TV end to activate the USB recording function.

The processor 1001 can call the program for customizing the USB recording function stored on the memory 1005 to further perform the following operations:

sending the first request key to the server end on condition that the client end acquires the first request key; and outputting the second activation key, on condition that the second activation key fed back by the server end is acquired based on the second activation key acquiring instruction.

Figure 2:
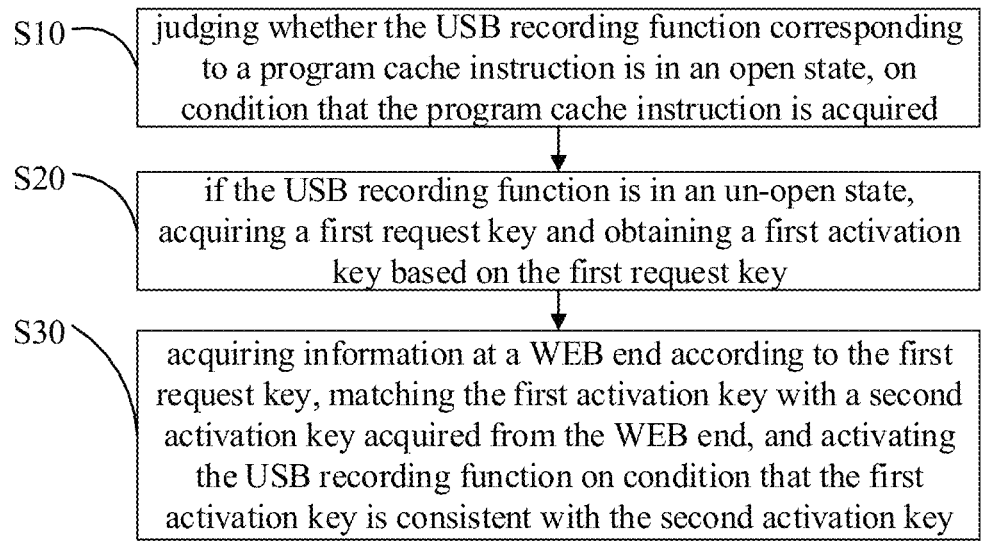
FIG. 2 is a flow chart of a method for customizing a USB recording function according to a first embodiment of the present disclosure.

The present disclosure provides a method for customizing a USB recording function according to a first embodiment. Referring to FIG. 2, FIG. 2 shows a flow chart of the method for customizing the USB recording function according to the first embodiment of the present disclosure. The method for customizing the USB recording function includes:

S10, judging whether the USB recording function corresponding to a program cache instruction is in an open state, on condition that the program cache instruction is acquired.

As the capacity and speed of hard disk are continuously improving with the development of hard disk technology, people prefers the Personal Video Recording (PVR) technology based on the hard disk, which contributed the generating of the USB recording technology. The time shifting is regarded as one major feature of the USB recording function. In detail, when the digital TV is turned on, the displayed programs can be recorded in real time, and the buffer area can be used for recording the programs for several hours. Users can pause the television program which is shown, then continue the displaying of the programs from pause point through the cache technique, as if the time had moved. The USB recording technology takes the hard disk as the storage medium, establishes local mass buffer area and huge program storage library, and controls and manages the programs through the digital processing technology. As such, the USB recording technology has the characteristics of large-capacity hard disk, digital, and fast access.

Under such circumstance, the USB recording function has now been commonly applied to TVs. However, after investigation, it is found that a large number of users may not actually use the USB recording function at all due to the viewing habits and viewing needs. But a patent fee should be payed for the TVs adopting the PVR technology. Therefore, the problem now is that many users who does not use the PVR technology at all should pay the patent fee to the digital TV manufacturers, which adds an unnecessary charging item to some consumers. For solving this problem, it is hoped that user can customize the USB recording function and activate the USB recording function when needed. The present disclosure mainly provides a method for user customizing the USB recording function. User decrypt the USB recording function of the TV by putting the encrypted key of the TV end on the website and acquiring the decryption code through a specific algorithm. After the USB recording function is decrypted, the company could pay the required patent fees and the like. Users do not need to pay the corresponding patent fees for PVR function again.

The Personal Video recorder (PVR) is regarded as a Video Cassette Recorder (VCR) which does not need to be equipped with a video tape. The normal VCR records TV programs to Video Home System (VHS) video tape, while the PVR adopts a built-in hard disk drive rather than the video tapes. After recording TV programs to the built-in hard disk, the recorded programs can be played at any time, can be fast-forwarded during viewing, and can be deleted when the programs are no longer required. The PVR can also update the program viewing guide. Through the program viewing guide, user can browse all the programs to be played in the next week, and can only record programs with certain keyword through programming the program viewing guide. The retrieval function of PVR is far from limited to retrieval of program name. PVR can also retrieve actors, directors, genres, etc.

Since the USB recording function is encapsulated during the TV production, user should activate the USB recording function when user needs to use the function for the first time. When user needs to use the USB recording function, user can trigger the USB recording function through a remote controller or other means, for sending out a program cache instruction. When receiving the program cache instruction, the TV end judges whether the user has successfully activated the USB recording function, if not, the TV end is configured to enter a program for activating the USB function.

S20, if the USB recording function is in an un-open state, acquiring a first request key and obtaining a first activation key based on the first request key.

If the user has not successfully activated the USB recording function, it means that the USB recording function is in an unopened state. When the program cache instruction is received, the first request key stored in the memory is obtained and displayed on the USB recording function activation interface. The request key in the figure indicates the first request key, and prompts user from which website the second activation key can be acquired through the first request key which is defined as the activation key as shown in the figure. Based on the first request key, the TV end can obtain the first activation key through one specific algorithm and store the first activation key for matching with the second activation key.

S30, acquiring information at a WEB end according to the first request key, matching the first activation key with a second activation key acquired from the WEB end, and activating the USB recording function on condition that the first activation key is consistent with the second activation key.

The WEB end refers to the internet device including the client end and the server end. The client can be any internet terminal, such as a computer or a smart phone terminal. User can record the first request key when acquiring obtains the first request key from the USB recording function activation interface displayed on the TV end. Then user can log in to the designated WEB site to obtain the corresponding second activation key through the first request key. When user inputs the first request key into the website, the server calculates the corresponding second activation key through the algorithm, and feeds the second activation key back to the client end, and the client end displays the second activation key. Then user inputs the second activation key output by the WEB end to the TV end. The TV matches the first activation key with the second activation key when receiving the second activation key, and activates the USB recording function when the second activation key is consistent with the first activation key.

The user needs to log in to the designated website when acquiring the second activation key. The designated website is organized by the television manufacturer to provide the user with the process for activating the USB recording function. Since building the commercial server has become a relatively mature technology in the context of the present disclosure and many third parties can provide such services, its implementation is not described in detail here.

The process of the TV end decrypting code includes acquiring a return value of true through checkActivationKey function, and unlocking the USB recording function according to the return value. In detail, whether the length of second activation key input by the user meets the requirement is judged according to the checkActivationKey function; then whether the S/N serial number of the TV end is empty is judged; taking MashedDecimalLexicon (an out-of-order sequence of from 0 to 9) as input dictionary and MzSNLex as the output dictionary, and converting the Activation key input by user into snFragmentFromResponse through the above-mentioned Convert method; and comparing snFragmentFromResponse with m_slicedSerial obtained from GetResquest before, and unlocking the USB recording function if snFragmentFromResponse is equal to m_slicedSerial.

Furthermore, in one embodiment, after S30, the method further includes:

paying, by a TV producer, a patent fee according to a quantity of the first activation key, on condition that the USB recording function is successfully activated.

If the second activation key input by the user matches with the first activation key calculated by the decryption algorithm of the television end, the USB recording function can be unlocked for the user. Meanwhile, the company needs to pay the corresponding patent fee after acquiring that user has decrypted the USB recording function of the machine.

In the method for customizing the USB recording function according to the embodiment, whether the USB recording function corresponding to the program cache instruction is in an open state is determined, when the program cache instruction is acquired; if not, the first request key is acquired, and the first activation key is also acquired based on the first request key; and the information of the WEB end is obtained according to the first request key, the first activation key is matched with the second activation key obtained from the WEB end, and the USB recording function is activated when the first activation key and the second activation key are consistent with each other. According to the method, the USB recording function is encapsulate. When user needs to use the USB recording function, the specific function can be activated through the activation key obtained from the designated website. The present disclosure provides an innovative idea of customizing the function for user, in detail, when user wants to user some additional functions, the manufacturer pays the extra cost generated, and user only needs to complete a few simple activation operations. As such, the cost can be reduced on the basis of maintaining the integrity of the TV function. User can choice the USB recording function, and the present disclosure also solves the problem: on condition that many users do not use the USB recording function at all, the company has to maintain and pay for the USB recording function for each machine based on this unreasonable market situation.

Figure 3:
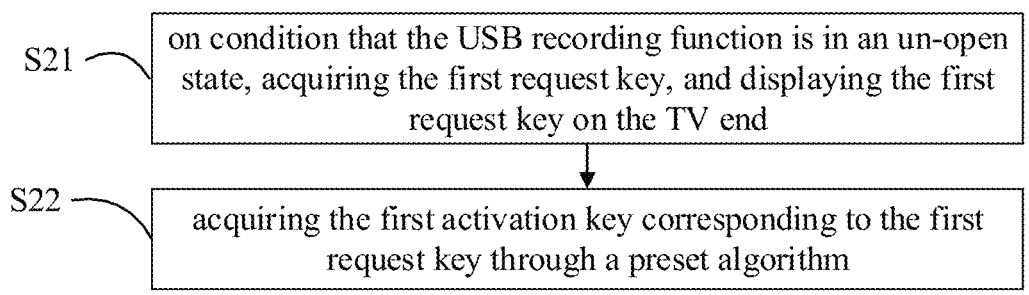
FIG. 3 is a detailed flow chart of the operation of if the USB recording function is in an un-open state, acquiring a first request key and obtaining a first activation key based on the first request key, in a method for customizing a USB recording function according to a second exemplary embodiment of the present disclosure.

Based on the first embodiment, the present disclosure provides a method for customizing a USB recording function according to a second embodiment. Referring to FIG. 3, S20 includes:

S21, on condition that the USB recording function is in an un-open state, acquiring the first request key, and displaying the first request key on the TV end.

Figure 4:
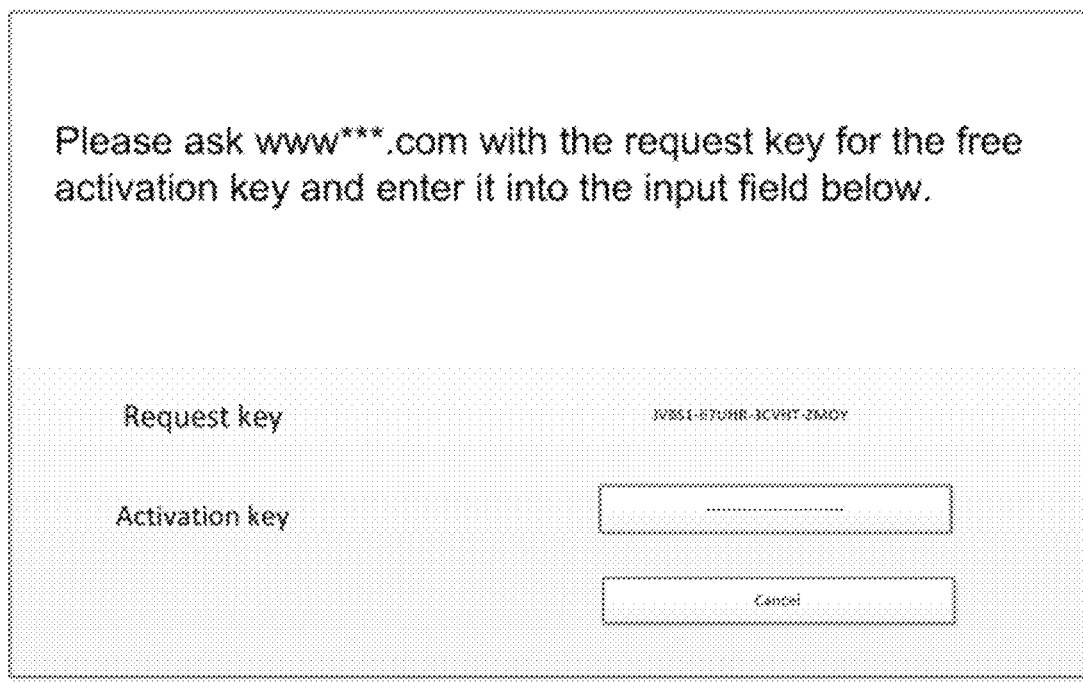
FIG. 4 shows an interface for activating the USB recording function at TV end, in the method for customizing the USB recording function according to the second embodiment of the present disclosure.

If the user has not successfully activated the USB recording function, it means that the USB recording function is in an unopened state. When the program cache instruction is acquired, the first Request key stored in the memory is obtained and displayed on the USB recording function activation interface of the TV end. As shown in FIG. 4, the request key in the figure represents the first request key, and prompts user from which website the second activation key can be obtained through the first request key which is defined as the activation key as shown in the figure.

S22, acquiring the first activation key corresponding to the first request key through a preset algorithm.

Based on the first request key, the TV end can obtain the first activation key through one specific algorithm and store the first activation key for matching with the second activation key.

In the method for customizing the USB recording function according to the embodiment, the first request key is acquired when the USB recording function is in the closed state, and the first request key is displayed on the TV end; then the first activation key corresponding to the first request key is obtained through the preset algorithm; when user needs to use the USB recording function, one instruction is issued to obtain the first request key displayed on the TV end, and the TV end can also obtain the first activation key based on the first request key, thereby ensuring that the first activation key is obtained according to one specific algorithm. The present disclosure provides a set of complete scheme for encapsulating, encrypting and decrypting the USB recording function, ranging from the definition of UI, processing of front-end data and back-end data, to the implementation methods in the production process. One of the greatest advantages of the present disclosure is to provide a new scheme for function configuration. In the future, the scheme can be applied on other selectable functions, to realize a user-customized function system, i.e. users can select the functions they need. Therefore, users can select their demanding functions while the cost for the enterprise is also reduced.

Figure 5:
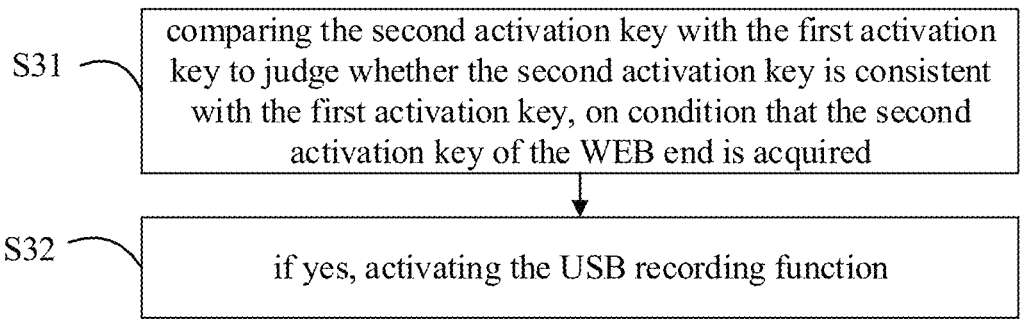
FIG. 5 is a detailed flow chart of the operation of acquiring information at a WEB end according to the first request key, matching the first activation key with a second activation key acquired from the WEB end, and activating the USB recording function on condition that the first activation key is consistent with the second activation key, in a method for customizing a USB recording function according to a third embodiment of the present disclosure.

Based on the first embodiment, the present disclosure provides a method for customizing a USB recording function according to a third embodiment. Referring to FIG. 5, S30 includes:

S31, comparing the second activation key with the first activation key to judge whether the second activation key is consistent with the first activation key, on condition that the second activation key of the WEB end is acquired.

Figure 6:
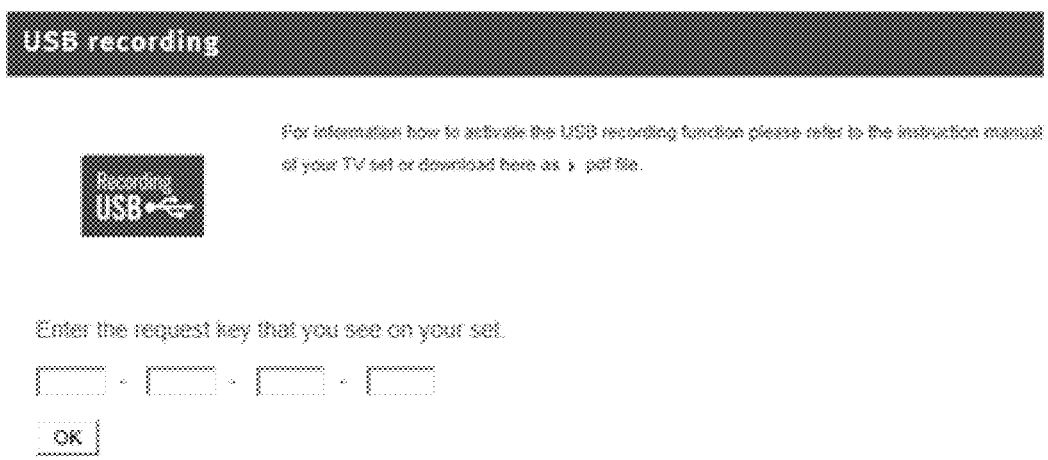
FIG. 6 is a schematic diagram of the operation of acquiring the second activation key from a designated website, in the method for customizing the USB recording function according to the third embodiment of the present disclosure.

The WEB end refers to the internet device including the client end and the server end. The client can be any internet terminal, such as a computer or a smart phone terminal. User can record the first request key when acquiring obtains the first request key from the USB recording function activation interface displayed on the TV end. Then user can log in to the designated WEB site to obtain the corresponding second activation key through the first request key. The interface for the server end acquiring the activation key is shown in FIG. 6. When user inputs the first request key (that is the request key as shown in the figure) into the website, the server end calculates the corresponding second activation key through the algorithm, then feeds the second activation key back to the client end, and the client end displays second activation key, and then user inputs the second activation key output by the WEB end to the TV end.

S32, if yes, activating the USB recording function.

The second activation key is matched with the first activation key when TV receives the second activation key. The USB recording function is activated when the second activation key is consistent with the first activation key.

Furthermore, in one embodiment, after S31, the method further includes:

if the first activation key is inconsistent with the second activation key, popping up a message to indicate a failure of activation.

The message for indicating the failure of activation is generated when the first activation key obtained by the TV end through the algorithm is inconsistent with the second activation key obtained by the user through the server end. The message for indicating the failure of activation is displayed on the TV end when the message for indicating the failure of activation is generated, for reminding the user to reactivate the USB recording function.

In the method for customizing the USB recording function according to the embodiment, whether the second activation key is consistent with the first activation key is determined by comparing the second activation key with the first activation key when the second activation key of the WEB end is acquired; then the USB recording function is activated when the first activation key is consistent with the second activation key. The first activation key obtained by the TV end itself through the algorithm can be used as a tool for checking the second activation key input by the user to judge whether the second activation key is correct, thus ensuring the integrity of the activation function and the reliability of the key.

Figure 7:
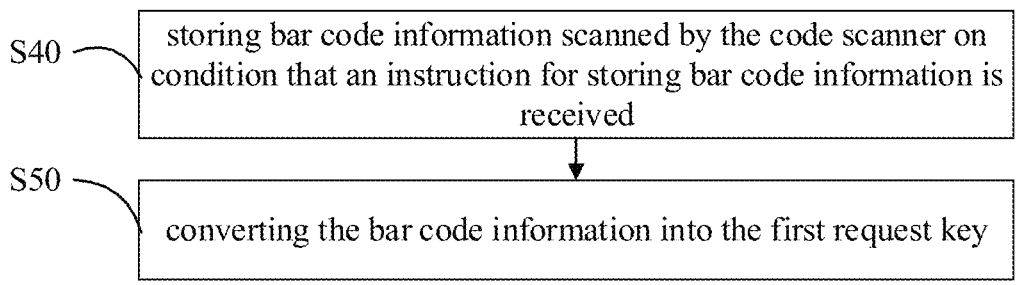
FIG. 7 is a flow chart of a method for customizing a USB recording function according to a fourth embodiment of the present disclosure.

Based on the first embodiment, the present disclosure provides a method for customizing a USB recording function according to a fourth embodiment. Referring to FIG. 7, after S30 the method further includes:

S40, storing bar code information scanned by the code scanner on condition that an instruction for storing bar code information is received.

This embodiment is formed from the perspective of a production line. In order to meet the needs of rapid production in factories and to ensure the uniqueness of the first request key of each machine, the present disclosure stores the first request key in the memory by scanning bar codes during production. That is, the code scanner scans the bar code provided in advance and uniquely corresponding to each machine during production, and then the information identified from the bar code is written into the memory for storage. In this way, not only the uniqueness of the first request key of each machine is satisfied, but also the rapidity requirement during factory production is satisfied.

S50, converting the bar code information into the first request key.

The data in the bar code can be stored in the memory after being read by the code scanner, and converted into the first request key.

Because the unique ID of each machine needs to be burned in the form of bar code during the production process, the present disclosure also provides a method of burning the ID in the form of bar code. The bar code needs to be stored in memory to ensure the uniqueness of each machine and meet the requirements of the algorithm. The bar code identification has 18 digits.

The TV end converts the bar code information into the first request key. In detail, the S/N serial number data captured from E2 is converted into the first request key, and the parameter aStringToEncrypt is regarded as the data captured from E2, and the data is also regarded as the PID (Product ID) that is burn into E2 through the above-mentioned recorder. That is, each TV has one unique data. The m_slicedSerial is the data needed for decryption. The last five bits of S/N serial number are saved through getRequestKey. The RequestKey to be obtained is stored in aStringToEncrypt pointer. The RequestKey includes challenge key and hash key. Among them, the challenge key is formed by converting aStringToEncrypt, MzSNLex, and AlphaNumLex through the Convert method. In the Convert method, a weight matrix is obtained according to the length of the input character string, and then aStringToEncrypt, MzSNLex, and AlphaNumLex is converted according to the weight matrix; and hash key which is challenge, is obtained processing challenge key and AlphaNumLex through getHash.

In the method for customizing the USB recording function according to the embodiment, the bar code information scanned by the code scanner is stored when the bar code information storage instruction is received; then the bar code information is converted into the first request key; the bar code is used to store relevant information, and then the relevant information is stored in the television terminal through scanning the bar code on the production line, thereby ensuring the uniqueness of each television and meeting the requirement of the algorithm meanwhile. That is, not only the requirement of fast production is met, but also the accuracy of stored information is ensured.

Figure 8:
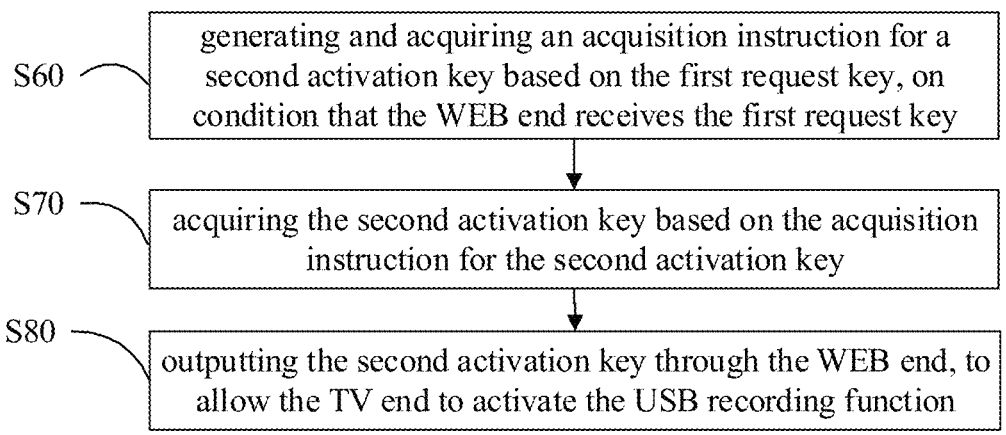
FIG. 8 is a flow chart of a method for customizing a USB recording function according to a fifth embodiment of the present disclosure.

The present disclosure provides a method for customizing a USB recording function according to a fifth embodiment. Referring to FIG. 8, FIG. 8 shows a flow chart of a method for customizing a USB recording function according to a fifth embodiment of the present disclosure. The method for customizing the USB recording function includes:

S60, generating and acquiring an acquisition instruction for a second activation key based on the first request key, on condition that the WEB end receives the first request key.

The embodiment is formed from the perspective of the WEB side. When the user obtains the first request key from the TV end, the user logs in to the assigned website through the client end, and inputs the first request key in the specified location. When the server receives the first request key, the server can calculate the second activation key according to the algorithm, and feed the second activation key back to the client end, and output the second activation key through the client end.

S70, acquiring the second activation key based on the acquisition instruction for the second activation key.

The server end may output the second activation key through the algorithm when the acquisition instruction for the second activation key containing the first request key is input into the server end. Specifically, the obtained character strings are reversely matched into an input definition dictionary through getValueFromLex, and a dictionary position matrix is derived; then, AkkuArray and ResultArray matrices are created, AkkuArray is configured for storing the weight matrix at the time of conversion, and ResultArray is configured for storing the converted location matrix; then the nested loop starts to convert, AkkuArray weight matrix modifies the superposition of weight length according to the input length, and ResultArray superposes its original value according to the weight matrix; then the value in the matrix is limited into the range of the output dictionary Index, and if the value exceeds the range, the model is taken according to the length of the output dictionary; finally, the corresponding value is acquired from the Index of ResultArray according to the output dictionary, and the converted string is returned.

S80, outputting the second activation key through the WEB end, to allow the TV end to activate the USB recording function.

The WEB end refers to the internet device including the client end and the server end. When the interaction between the client end and the server end is ignored, the client end and the server end are regarded as a whole and combined to form the WEB end. Therefore, when the user inputs the first request key, the WEB end can calculate one second activation key based on the request key, and then output the activation key. The second activation key can be output and displayed on a display, and can also be transmitted to a designated location by other means.

In the method for customizing the USB recording function according to the embodiment, the second activation key is acquired based on the first request key when the first request key is acquired; then the second activation key is output through the WEB end. Acquiring the second activation key on the website set up by television manufacturer can ensure the accuracy and safety of the key. In addition, the establishment of a commercial server can also conveniently solve the problem of acquiring the second activation key through the first request key.

Figure 9:
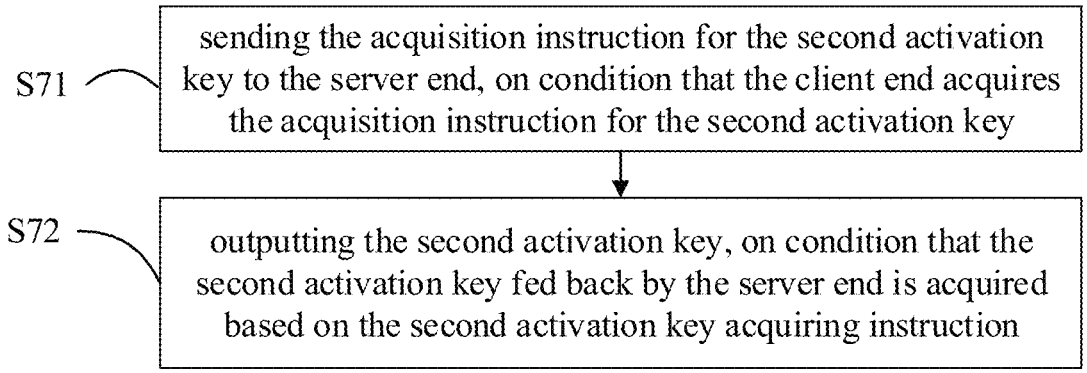
FIG. 9 is a flow chart of the operation of acquiring a second activation key based on the acquisition instruction for the second activation key, in the method for customizing the USB recording function according to the sixth embodiment of the present disclosure.

Based on the fifth embodiment, the present disclosure provides a method for customizing a USB recording function according to a sixth embodiment. Referring to FIG. 9, S70 includes:

S71, sending the acquisition instruction for the second activation key to the server end, on condition that the client end acquires the acquisition instruction for the second activation key.

When user obtains the first request key from TV end, the user logs in to the assigned website through the client end, and inputs the first request key in the specified location. Then the first request key is sent to the corresponding server end through the client end. Client end refers to all intelligent terminals that can access the internet, such as computer and smart phone. Since the license fee for the PVR function of the USB recording is paid according to the quantity of keys downloaded by user, the server needs to count the quantity of the activation key, and the manufactures can pay based on this quantity.

S72: outputting the second activation key, on condition that the second activation key fed back by the server end is acquired based on the second activation key acquiring instruction.

When receiving the first request key, the server end can obtain the second activation key according to the algorithm, and feed it back to the client end, and then the second activation key is output. The second activation key can be output and displayed on a display, and can also be transmitted to a designated location by other means.

In the method for customizing the USB recording function according to the embodiment, the acquisition instruction for the second activation key is sent to the server end when the client end acquires the acquisition instruction for the second activation key; the second activation key is output when the second activation key fed back by the server end is obtained based on the second activation key acquiring instruction; and user accesses the designated website through the client end and obtains the second activation key on the website based on the first request key, thereby improving the convenience and ensuring the security of the key.

The present disclosure also provides a computer readable storage medium according to an embodiment.

The computer readable storage medium of the present disclosure stores a program for customizing a USB recording function. The program, when executed by a processor, performs the following operations:

judging whether the USB recording function corresponding to a program cache instruction is in an open state, on condition that the program cache instruction is acquired;

if the USB recording function is in an un-open state, acquiring a first request key and obtaining a first activation key based on the first request key; and acquiring information at a WEB end according to the first request key, matching the first activation key with a second activation key acquired from the WEB end, and activating the USB recording function on condition that the first activation key is consistent with the second activation key.

The program for customizing the USB recording function, when executed by the processor, further performs the following operations:

acquiring the first request key, and displaying the first request key on the TV end; and acquiring the first activation key corresponding to the first request key through a preset algorithm.

The program for customizing the USB recording function, when executed by the processor, performs the following operations:

comparing the second activation key with the first activation key to judge whether the second activation key is consistent with the first activation key, on condition that the second activation key of the WEB end is acquired; and if yes, activating the USB recording function.

The program for customizing the USB recording function, when executed by the processor, performs the following operations:

if not, popping up a message to indicate a failure of activation.

The program for customizing the USB recording function, when executed by the processor, performs the following operations:

storing bar code information scanned by the code scanner on condition that an instruction for storing bar code information is received; and converting the bar code information into the first request key.

The program for customizing the USB recording function, when executed by the processor, performs the following operations:

paying, by a TV producer, a patent fee according to a quantity of the first activation key, on condition that the USB recording function is successfully activated.

The program for customizing the USB recording function, when executed by the processor, performs the following operations:

generating and acquiring an acquisition instruction for a second activation key based on a first request key, on condition that the WEB end receives the first request key;

acquiring a second activation key based on the acquisition instruction for the second activation key; and outputting the second activation key through the WEB end, to allow the TV end to activate the USB recording function.

The program for customizing the USB recording function, when executed by the processor, performs the following operations:

sending the first request key to the server end on condition that the client end obtains the first request key; and outputting the second activation key, on condition that the second activation key fed back by the server end is acquired based on the first activation key acquiring instruction.

It needs to be noted that in the present disclosure, the terms "comprising", "including" or other variants aim to cover non-exclusive inclusion, such that the processes, methods, articles or devices including a series of factors not only include these factors, but also include other factors not listed explicitly, or further include intrinsic for such processes, methods, articles or devices. In the absence of more limitations, the factors limited by "comprising a" do not exclude that additional identical factors are also included in the processes, methods, articles or devices including said factors.

The serial number in the above embodiments of the present disclosure is only for the purpose of explanation and not intended to indicate the merits of the embodiments.

Through above description of the embodiments, it should be understood by those skilled in the art that the present disclosure may be implemented by means of software in connection with necessary universal hardware platform. Of course, the present disclosure may also be implemented by a hardware. However, in many cases the former is more preferred. Based on this understanding, all or the part contributing to the prior art of the technical solution of the present disclosure may be embodied in the form of software. The computer software may be stored on a storage medium (such as ROM/RAM, diskette, or light disk) and include a plurality of instructions which are used to implement the method as described in the various embodiments of the present disclosure by a terminal device (such as a mobile phone, a computer, a server, an air conditioner, or a network device, etc.).

The embodiments above are preferably embodiments of the present disclosure, and the present disclosure is not limited to such embodiments, equivalent structure conversion based on the specification and the drawing of the present disclosure, or directly or indirectly used in other related technical field, both similarly within the protection scope of the present disclosure.

What is claimed is:

1. A method for customizing a USB recording function, applied to a system for customizing the USB recording function, wherein the system comprises a TV end and a WEB end, and the method comprises the following operations:
    acquiring a program cache instruction;
    determining a USB recording function corresponding to the program cache instruction is in an un-open state, acquiring a first request key and obtaining a first activation key based on the first request key; and
    acquiring information at a WEB end according to the first request key, matching the first activation key with a second activation key acquired from the WEB end, and determining the first activation key is consistent with the second activation key, activating the USB recording function.

2. The method according to claim 1, wherein the operation of determining a USB recording function corresponding to the program cache instruction is in an un-open state, acquiring a first request key and obtaining a first activation key based on the first request key, comprises:
    acquiring the first request key, and displaying the first request key on the TV end; and
    acquiring the first activation key corresponding to the first request key through a preset algorithm.

3. The method according to claim 1, wherein the operation of matching the first activation key with a second activation key acquired from the WEB end, and determining the first activation key is consistent with the second activation key, activating the USB recording function, comprises:
    in response to acquiring the second activation key of the WEB end, comparing the second activation key with the first activation key; and
    determining the second activation key is consistent with the first activation key, activating the USB recording function.

4. The method according to claim 1, wherein the system for customizing the USB recording function comprises a code scanner, and before the operation of acquiring a program cache instruction, the method further comprises:
    receiving an instruction for storing bar code information, storing bar code information scanned by the code scanner; and
    converting the bar code information into the first request key.

5. The method according to claim 1, wherein after the operation of acquiring information at a WEB end according to the first request key, matching the first activation key with a second activation key acquired from the WEB end, and determining the first activation key is consistent with the second activation key, activating the USB recording function, the method further comprises:
    paying, by a TV producer, a patent fee according to a quantity of the first activation key, in response to successfully activating the USB recording function.

6. A device for customizing a USB recording function, wherein the device comprises a memory, a processor, and a program for customizing the USB recording function stored on the memory and executable on the processor, and the program, when executed by the processor, performs the following operations:
    judging whether the USB recording function corresponding to a program cache instruction is in an open state, on condition that the program cache instruction is acquired;
    if the USB recording function is in an un-open state, acquiring a first request key and obtaining a first activation key based on the first request key; and
    acquiring information at a WEB end according to the first request key, matching the first activation key with a second activation key acquired from the WEB end, and activating the USB recording function on condition that the first activation key is consistent with the second activation key.

7. The device according to claim 6, wherein the program, when executed by the processor, further performs the following operations:
    acquiring the first request key, and displaying the first request key on the TV end; and
    acquiring the first activation key corresponding to the first request key through a preset algorithm.

8. The device according to claim 6, wherein the program, when executed by the processor, further performs the following operations:
    comparing the second activation key with the first activation key to judge whether the second activation key is consistent with the first activation key, on condition that the second activation key of the WEB end is acquired; and
    if yes, activating the USB recording function.

9. The device according to claim 6, wherein the program, when executed by the processor, further performs the following operations:
- generating and acquiring an acquisition instruction for a second activation key based on the first request key, on condition that the WEB end receives the first request key;
- acquiring the second activation key based on the acquisition instruction for the second activation key; and
- outputting the second activation key through the WEB end, to allow the TV end to activate the USB recording function.

10. A non-transitory computer-readable storage medium, wherein a program for customizing a USB recording function is stored on the computer readable storage medium, and the program, when executed by a processor, performs the following operations:
- judging whether the USB recording function corresponding to a program cache instruction is in an open state, on condition that the program cache instruction is acquired;
- if the USB recording function is in an un-open state, acquiring a first request key and obtaining a first activation key based on the first request key; and
- acquiring information at a WEB end according to the first request key, matching the first activation key with a second activation key acquired from the WEB end, and activating the USB recording function on condition that the first activation key is consistent with the second activation key.

11. The non-transitory computer-readable storage medium according to claim 10, wherein the program, when executed by the processor, further performs the following operations:
- acquiring the first request key, and displaying the first request key on the TV end; and
- acquiring the first activation key corresponding to the first request key through a preset algorithm.

12. The non-transitory computer-readable storage medium according to claim 10, wherein the program, when executed by the processor, further performs the following operations:
- comparing the second activation key with the first activation key to judge whether the second activation key is consistent with the first activation key, on condition that the second activation key of the WEB end is acquired; and
- if yes, activating the USB recording function.

* * * * *